H. R. GILSON.
CONDUIT CONNECTOR.
APPLICATION FILED FEB. 21, 1916.

1,225,614.

Patented May 8, 1917.

WITNESSES
Paul M. Critchlow
Francis J. Tomasson

INVENTOR
Henry R. Gilson
by Christy and Christy
his attorneys.

UNITED STATES PATENT OFFICE.

HENRY R. GILSON, OF BADEN, PENNSYLVANIA, ASSIGNOR TO NATIONAL METAL MOLDING COMPANY, OF PITTSBURGH, PENNSYLVANIA, A CORPORATION OF PENNSYLVANIA.

CONDUIT-CONNECTOR.

1,225,614.  Specification of Letters Patent.  Patented May 8, 1917.

Application filed February 21, 1916. Serial No. 79,698.

*To all whom it may concern:*

Be it known that I, HENRY R. GILSON, residing at Baden, in the county of Beaver and State of Pennsylvania, a citizen of the United States, have invented or discovered certain new and useful Improvements in Conduit-Connectors, of which improvements the following is a specification.

My invention relates to installations of two-part conduits for electrical conductors, and the object thereof is to provide a connector for attaching two of such conduits together at the meeting point of their ends, one of which conduits extends through a wall or partition and the other of which lies on the face of such partition.

Figure 1:
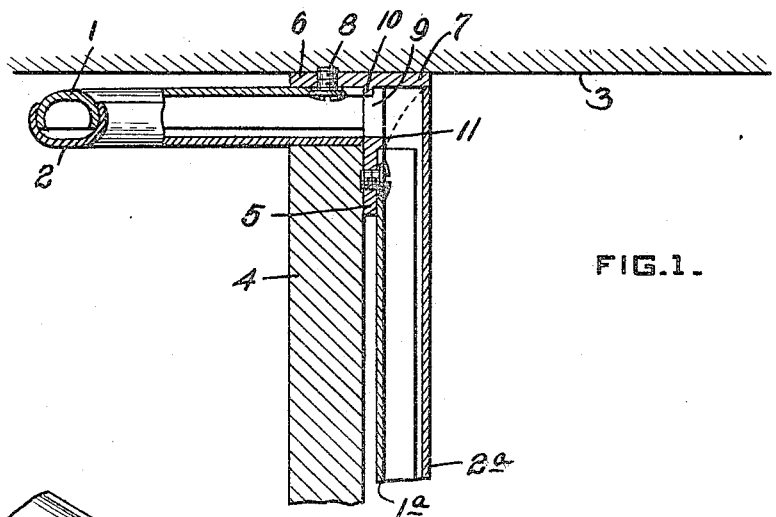
Figure 2:
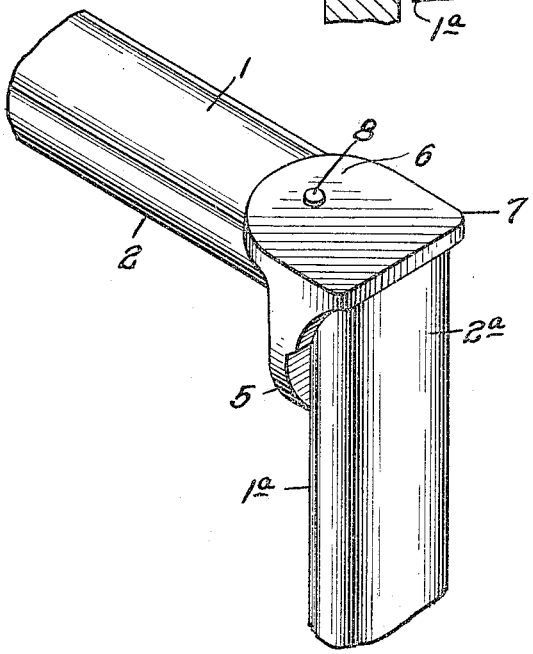

In the accompanying sheet of drawings, forming part of my specification, I have illustrated the preferred embodiment of my invention. Figure 1 is a vertical sectional view through the conduits and connector as installed, and Fig. 2 is a perspective view of the conduits and connector.

The connector shown herein is particularly adapted to be used with two-part conduits consisting of a semi-elliptical base 1 and a similarly shaped cover 2 adapted to be snapped upon the base. It will, however, be understood that my invention is applicable to other forms of two-part conduits.

In the illustrative embodiment of my invention one conduit 1, 2 extends along a ceiling 3 and through an opening in the wall or partition 4 adjacent to the ceiling, while the other conduit $1^a$, $2^a$ extends vertically along the partition. The connector for attaching these two conduits together at the meeting point of their ends is a T-shaped member having a stem 5, and, at the upper end thereof, oppositely projecting arms 6 and 7. The stem and arms are plate-like members integrally united to each other preferably by being cast as a single piece. The arm 6 is provided with a screw-threaded hole adapted to receive a screw 8 for the attachment of the conduit base 1, and in a similar manner the base $1^a$ is attached to the stem 5. Adjacent to the arms 6 and 7 the stem 5 is provided with an opening 9 through which the conductors carried in the conduits may pass. It will be observed that the base of the stem forms a bead 10 against which the base 1 abuts and which prevents the insulation of the conductors from being abraded by the ragged cut end of the conduit. For the same purpose the stem is provided with a bead 11 against which the conduit base $1^a$ abuts, it being understood that, as indicated, the cover $2^a$ projects beyond the base $1^a$ to the arm 7, which closes the otherwise open end of the vertical conduit.

It will be observed of the connection which I provide for conduits positioned in the manner described, that it affords an unbroken metal wall for inclosing the conductors, which with little difficulty may be laid in the conduits in the usual manner.

According to the provisions of the patent statutes I have described the principle and operation of my invention together with the construction which I now consider to represent the best embodiment thereof. However, I desire to have it understood that the construction shown is only illustrative, and that my invention may be practised by other forms of construction.

I claim as my invention:

In an electrical installation, the combination of a T-shaped connector formed of integrally united plates and comprising a stem and oppositely projecting arms at one end thereof, said stem adjacent to said arms being provided with an opening through which electrical conductors may pass, a two-part conductor conduit extending parallel with and having its base attached to one of said arms, and a second such conduit extending parallel with and having its base attached to said stem, the second arm of said connector forming a closure for the otherwise open end of said second-named conduit.

In testimony whereof I have hereunto set my hand.

HENRY R. GILSON.

Witnesses:
PAUL N. CRITCHLOW,
FRANCIS J. TOMASSON.

Copies of this patent may be obtained for five cents each, by addressing the "Commissioner of Patents, Washington, D. C."